United States Patent [19]

Pierce

[11] Patent Number: 4,938,097
[45] Date of Patent: Jul. 3, 1990

[54] FOUR SPEED TRANSAXLE FOR AUTOMOTIVE VEHICLES

[75] Inventor: Stanley L. Pierce, Northville, Mich.

[73] Assignee: Ford Motor Company, Dearborn, Mich.

[21] Appl. No.: 336,145

[22] Filed: Apr. 11, 1989

[51] Int. Cl.5 .............................................. F16H 37/08
[52] U.S. Cl. ....................................... 475/72; 475/206
[58] Field of Search .......................... 74/694, 695, 701

[56] References Cited

U.S. PATENT DOCUMENTS

| | | | |
|---|---|---|---|
| 3,446,095 | 5/1969 | Bookout | 74/695 X |
| 3,491,621 | 1/1970 | Moan | 74/695 X |
| 4,056,988 | 11/1977 | Knbo et al. | 74/695 |
| 4,224,837 | 9/1980 | Croswhite | 74/688 |
| 4,346,622 | 8/1982 | Pierce | 74/695 X |
| 4,368,649 | 1/1983 | Vahratian et al. | 74/695 |
| 4,418,585 | 12/1983 | Pierce | 74/695 |
| 4,452,099 | 6/1984 | Croswhite | 74/695 |
| 4,454,786 | 6/1984 | Stockton | 74/695 X |
| 4,607,541 | 8/1986 | Minra et al. | 74/740 X |
| 4,624,154 | 11/1986 | Kraft et al. | 74/695 |
| 4,638,686 | 1/1987 | Lemieux et al. | 74/695 X |
| 4,722,242 | 2/1988 | Minra et al. | 74/695 |
| 4,841,804 | 6/1989 | Minra et al. | 74/695 X |

Primary Examiner—Dirk Wright
Attorney, Agent, or Firm—Donald J. Harrington; Frank G. McKenzie; Keith L. Zerschling

[57] ABSTRACT

A hydrokinetic torque converter transaxle having a hydrokinetic torque converter, two simple planetary gear units and a clutch-and-brake system situated concentrically with respect to the axis of a vehicle engine wherein the torque output member of the planetary gear units is located in midposition between the planetary gear units and the hydrokinetic converter. A drive chain forms a torque transfer drive from the axis of the converter to a parallel axis coinciding with the axis of a geared differential, a pair of half shafts being connected to side gears of the differential for powering traction wheels wherein the clutch-and-brake system and the planetary gear units as well as the drive chain are integrated one with respect to the other to provide a minimum axial dimension with respect to the axis of the engine crankshaft thereby facilitating the packaging of the transaxle in a limited space within the vehicle. The torque flow path from the turbine of the converter through the gearing and from the gearing to the torque transfer drive chain is accomplished by strategically positioned torque transfer sleeve shafts surrounding the axis of the converter.

8 Claims, 5 Drawing Sheets

| GEAR | RC | CC | FC | DC | L/R | 2/4 | OWC2 DR | OWC2 CO | OWC1 DR | OWC1 CO | RATIO | COAST BRAK'G |
|---|---|---|---|---|---|---|---|---|---|---|---|---|
| M-1 |  | X | X |  | X |  | X | — | X | — | 2.889 | YES |
| M-2 |  | X | X |  |  | X | X | — | OR | OR | 1.571 | YES |
| M-3 |  | X | X | X |  |  | X | — | OR | OR | 1.000 | YES |
| 1ST |  |  | X |  |  |  | X | OR | X | OR | 2.889 | NO |
| 2ND |  |  | X | X |  | X | X | OR | OR | OR | 1.571 | NO |
| 3RD |  |  | X | X |  |  | X | OR | OR | OR | 1.000 | NO |
| 4TH |  |  | X |  |  | X | OR | OR | OR | OR | .689 | YES |
| REV. | X |  |  |  | X |  | — | — | — | — | 2.310 | YES |

FIG. 7

FOUR SPEED TRANSAXLE FOR AUTOMOTIVE VEHICLES

BACKGROUND OF THE INVENTION

My invention comprises improvements in prior art transaxle designs, of the type disclosed in my prior U.S. Pat. Nos. 4,346,622 and 4,418,585. It comprises improvements also in the transaxle arrangement disclosed in Vahratian et al U.S. Pat. No. 4,368,649; Croswhite U.S. Pat. No. 4,224,837; Bookout U.S. Pat. No. 3,446,095; Moan U.S. Pat. No. 3,491,621 and Croswhite U.S. Pat. No. 4,452,099, each of which is assigned to the assignee of this invention. It comprises improvements also in U.S. Pat. Nos. 4,607,541 and 4,056,988.

Each of these prior art references describes a transaxle having a converter and a gearing system wherein the axis of the converter is situated in spaced, parallel relationship with respect to the axis of a driving differential for vehicle half shafts. In each case a drive chain or a torque transfer gear system is used to deliver torque from one axis to another prior to its distribution to a final drive and to a differential and axle assembly.

It is essential in transaxles of this type for the torque transfer elements to be arranged in such a way that a minimum axial spacing is required for the axial stackup dimensions. This permits packaging in a front wheel drive vehicle wherein the engine and transmission are situated in an engine and transmission compartment that is restricted in space because of vehicle styling requirements.

When torque multiplication gearing portions of the transaxle are situated on an axis parallel to and offset from the axis of the converter, the packaging considerations are different than they are when the torque transfer elements are situated on a common axis with respect to the axis of the converter and the engine. In an arrangement of the type shown in my earlier U.S. Pat. No. 4,418,585, the major torque transfer elements are situated on the torque output shaft axis rather than on the engine crankshaft axis so the torque delivery gearing is laterally offset or overlapping with respect to the engine crankshaft, thus reducing the overall axial dimensions of the transaxle and engine assembly. When the torque delivery gearing is located on a common axis with the converter and the engine, however, this overlapping and offset disposition of the gearing with respect to the engine cannot be accomplished. Thus the problem of reducing the overall stackup of the axial dimensions of the converter and the gearing, as well as the clutches, requires an alternate solution.

In prior art U.S. Pat. Nos. 4,224,837; 4,452,099; and 4,346,622 the gearing is located on a common axis but an undesirable elongation of the overall dimensions of the engine and transaxle assembly occurs. This problem is more pronounced in the arrangement of U.S. Pat. Nos. 4,224,837 and 4,346,622 than in the case of the gearing structure shown in U.S. Pat. No. 4,452,099 because in the design of the latter patent only the overdrive gearing is located on the converter axis while the multiple ratio torque multiplication gearing is located on a parallel, offset axis in common with the axis of the differential and axle assembly.

In each of the gearing systems shown in U.S. Pat. No. 4,346,622 a drive chain is used to transfer torque between one axis and the other. The drive chain, which serves as the torque transfer mechanism, is disposed between the torque multiplication gearing and the converter. The requirement that the location of the transfer drive be at this place necessarily increases the overall dimensions of the transaxle and engine assembly. Further, each of these gearing constructions of the prior art references has at least a portion of the clutch and brake system situated between the converter and the gearing. This exacerbates the space problem. In the case of U.S. Pat. No. 4,224,837 a torque transfer chain is located between the converter and a portion of the clutch and brake system. In the case of U.S. Pat. No. 4,346,622, the clutches and brakes are located between the converter and the torque transfer chain.

BRIEF DESCRIPTION OF THE INVENTION

In my improved transaxle I have overcome the problems associated with transaxles having torque multiplication gearing and clutch and brake assemblies on a common axis with respect to the converter and the engine by providing a unique disposition of the torque transfer drive with respect to the planetary gearing and a unique disposition of the clutches and brakes with respect to the planetary gearing. The result of this is an improved economy of space for the overall assembly.

My improvement includes a reentrant torque delivery path between the turbine of the converter and the planetary gear system through the clutch elements of the transaxle using three concentrically disposed sleeve shafts mounted about a torque transfer internal shaft connecting the turbine with torque input elements of the clutches, the latter being located on one side of the planetary gearing and the converter being located on the other. The torque transfer drive used to transfer torque between the parallel offset axes of the transmission includes a drive chain that is situated generally on a common transverse plane with respect to one of two simple planetary gear units and is formed integrally or connected directly to a torque output element of that gear unit. This further reduces the axial dimensions of the overall assembly.

BRIEF DESCRIPTION OF THE FIGURES OF THE DRAWINGS

FIGS. 1A, 1B and 1C show a cross-sectional assembly view of the improved transaxle of my invention including a hydrokinetic torque converter, the clutches and the brakes of the planetary gearing, the torque transfer drive and the differential and axle assembly.

FIG. 2 is a schematic drawing of the transaxle assembly of FIGS. 1A, 1B and 1C.

FIG. 3 is a chart that shows the engagement and release pattern for the clutches and brakes for the transaxle assembly of FIGS. 1A, 1B and 1C.

PARTICULAR DESCRIPTION OF THE INVENTION

Figure 1A:
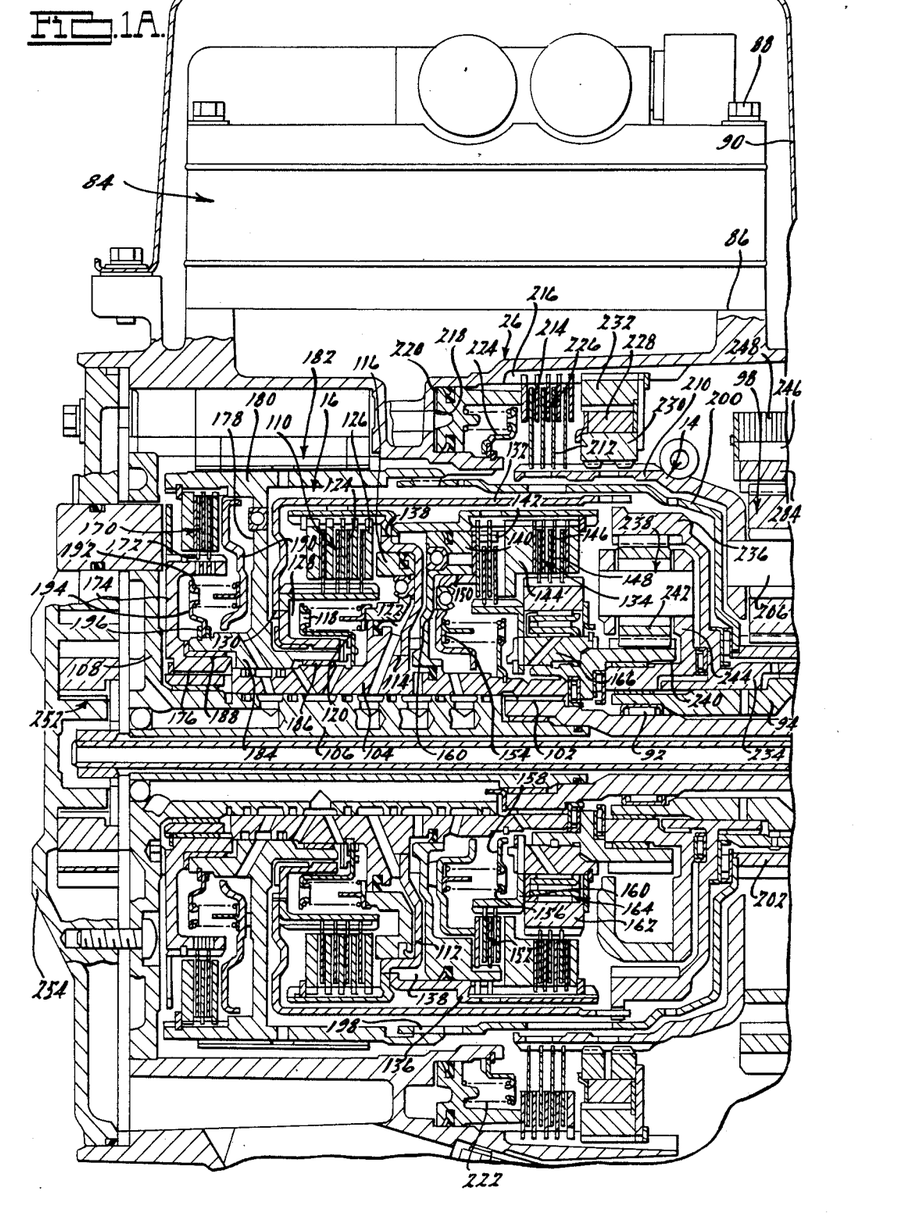
Figure 1B:
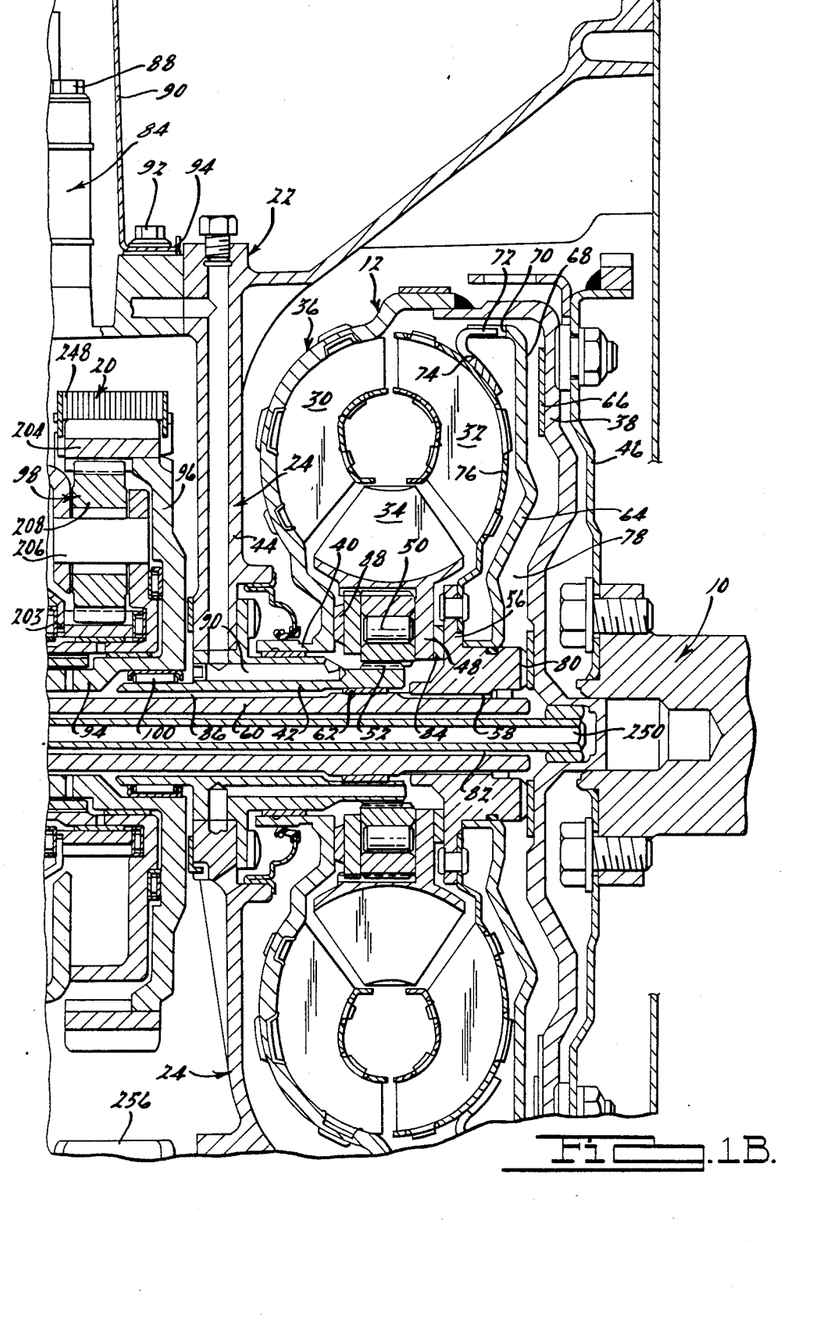
Figure 4:
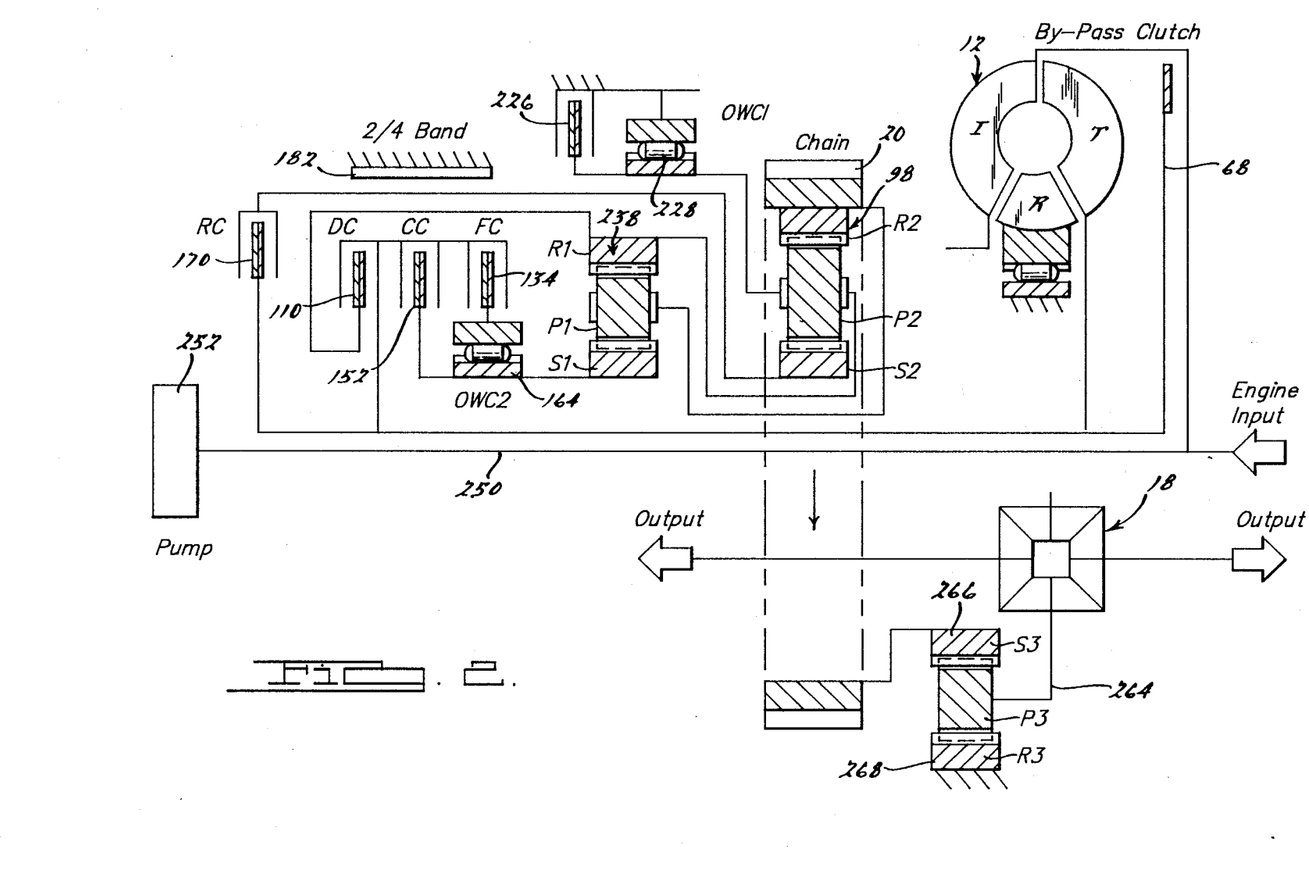
Figure 7:
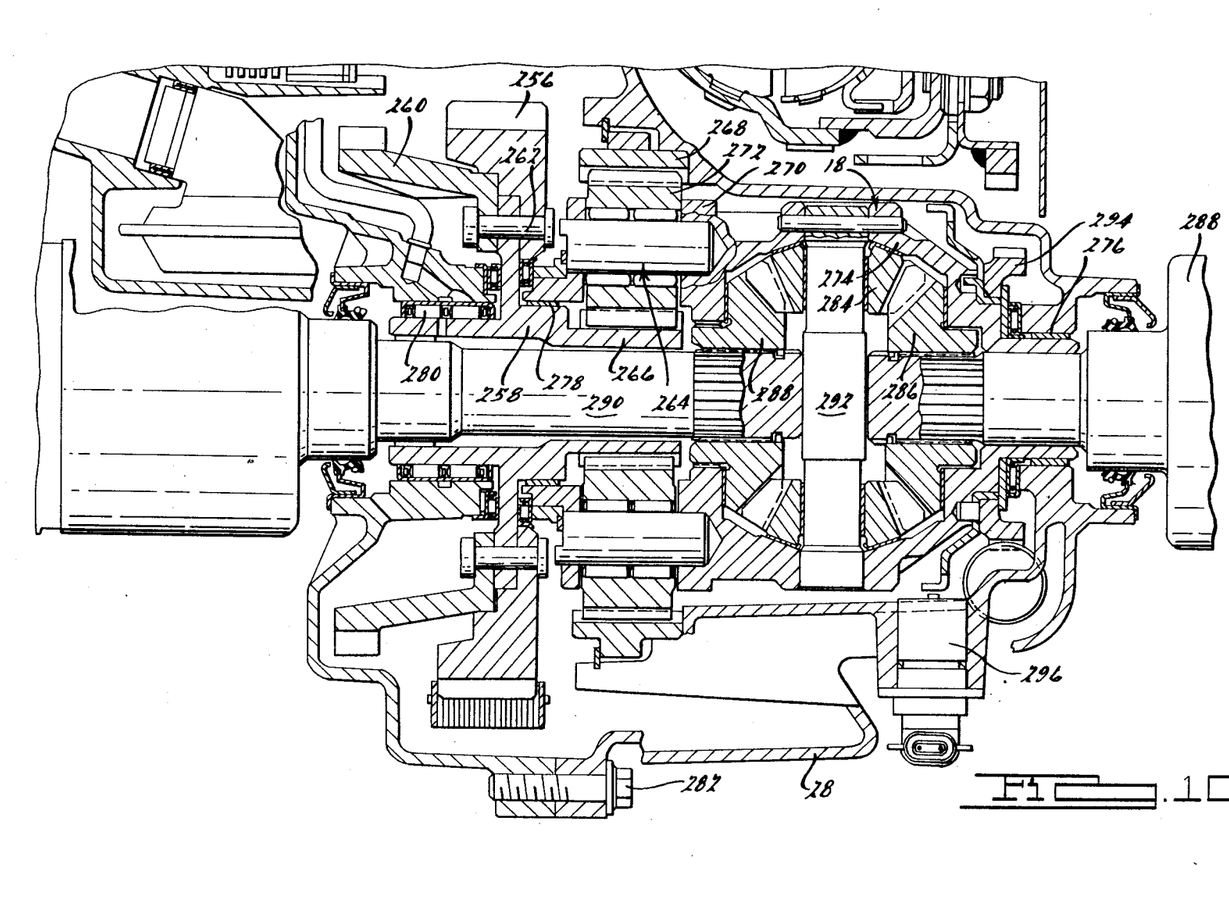

In FIG. 1B the end of the crankshaft of an internal combustion engine is shown at 10. A hydrokinetic torque converter is generally indicated at 12. Planetary gearing is generally indicated at 14. The clutch and brake system is generally indicated at 16 and the final drive and differential and axle assembly is generally indicated at 18. A torque transfer drive generally indicated at 20 transfers torque from the axis of the converter 12 to the axis of the differential and axle assembly 18.

The converter 12, the clutch and brake assembly 16, the gearing 14 and the torque transfer chain 20 are situated in a common cast housing generally indicated at 22. The housing 22 includes a converter housing portion 24, a portion 26 which encloses a clutch and brake assembly as well as the planetary gearing and a portion 28 which encloses the differential and axle assembly as well as the final drive gear unit.

Torque Converter

The converter 12 includes a bladed impeller 30, a bladed turbine 32 and a bladed stator 34, the latter being located between the flow exit section of the turbine and the flow entrance section of the impeller.

The impeller comprises an impeller shroud 36 forming a part of an impeller housing, the latter including an impeller housing wall 38. Radial outflow blades are arranged in well known fashion in the impeller shroud 36.

The impeller has a hub 40 that is journalled on the stationary stator support sleeve shaft 42. This is secured to a radially inward portion of housing support wall 44 forming a part of the housing 22.

Crankshaft 10 is connected by drive plate 46 to the radially outward portion of the wall 38 thereby forming a driving connection between the crankshaft and the impeller housing. The stator 34 of the converter 12 comprises radially disposed blades arranged in known fashion and a converter hub 48 which encloses an overrunning brake in the form of a roller brake 50, the inner race of which is splined at 52 to the stationary sleeve shaft 42.

The turbine 32 includes an outer shroud 54 which carries radial inflow blades in known fashion. Turbine 32 includes a hub 56 to which the shroud 54 is secured by rivets or the like. The hub 56 is splined at 58 to a turbine sleeve shaft 60, which is journalled at 62 in the stationary sleeve shaft 42.

Clutch and Brake Assembly

A clutch plate 64 is formed with a central opening and is supported by the turbine hub 56. It is adapted to slide on the hub in response to the forces of the pressure in the torus circuit of the converter. A friction disc 66 is secured to the radially outward surface of the impeller housing wall 38. It is adapted to be engaged by annular surface 68 on the piston plate 64 when the latter shifts into engagement. The radially outward margin of the piston plate 64 has a series of recesses 70 in which are received driving tangs formed on drive tabs 74 secured preferably by welding to the outer surface of the turbine shroud 76, the latter being drivably connected to the turbine hub 56.

Control pressure is distributed to the pressure cavity 78 defined by the piston plate 64 and the adjacent impeller wall 38. Pressure is distributed to that pressure cavity through radial ports 80 in the turbine hub 56. Those ports communicate with annular control pressure passage 82 which receives control pressure from internal porting which communicates with control valve body 84 secured to surface 86 at the upward region of the housing 22. It is secured by bolts 88. The valve body 84 is surrounded by a valve body cover 90 secured by bolts 92 to a boss 94 formed on the upper portion of the housing 22.

The tabs 74 are slidably connected to the outer periphery of the piston plate 64. By controlling the pressure in cavity 78, the clutch engaging force can be controlled. This is done by establishing a modulated pressure in the cavity 78 by means of a valve circuit under the control of a microprocessor that responds to engine torque signals, signals that determine the gear ratio and a vehicle speed signal as well as other variables. The pressure in cavity 78 is controlled to permit a controlled degree of slip at the engaging friction surfaces of the disc 66 and the friction surface 68 of the piston plate 64. A portion of the torque transmitted from the engine crankshaft 10 to the turbine shaft 60 is delivered mechanically in parallel relationship with respect to the hydrokinetic torque delivery path through the converter whenever the torque converter clutch plate 64 is in a partially engaged mode. The fluid that is distributed under pressure to the cavity 78 circulates radially outwardly into the torus circuit and through radial flow passage 84 in the hub of stator 34. Fluid then passes across bearing 62 into low pressure lubrication passage 86 located between the turbine sleeve shaft 60 and the surrounding stationary sleeve shaft 42. Fluid is supplied to the torus circuit through flow passage 88 formed in the hub of stator 34. Passage 88 communicates with converter feed passage 90 located in the stator sleeve shaft 42 and in the radial wall portion 24 of the housing 22.

Turbine sleeve shaft 60 is supported at its left hand end by bearing 92 in the sleeve hub 94 of chain support 96, which extends radially outwardly between the wall portion 24 and planetary gear unit 98. Sleeve 94 is journalled in turn by bearing 100, which is mounted on the stator sleeve shaft 42.

The left hand end of turbine sleeve shaft 60 is splined at 102 to clutch sleeve 104 which is rotatably supported by stationary sleeve 106. This forms an extension of or is formed integrally with end wall 108 of the housing portion 26. A direct clutch generally identified by reference numeral 110 has a clutch cylinder 112, which is secured preferably by welding at 114 to the clutch sleeve 104. Clutch cylinder 112 forms an annular piston cavity in which is positioned an annular piston 116. A piston return spring assembly 118 has a spring cage 120 secured by snap ring to the clutch sleeve 104. It has a plurality of compression springs anchored to the cage 120. These apply a piston return spring force to the piston 116.

When the piston is stroked, pressure is distributed to the pressure chamber 122. The clutch discs and separator plates generally identified at 124 and 126 are brought into frictional engagement thereby establishing a driving connection between cylinder 112 and externally splined clutch element 128, the latter being secured at 130 to torque transfer shell 132.

A forward clutch generally identified by reference numeral 134 comprises a clutch cylinder 136 which is secured at 138 to the clutch cylinder 112. The clutch cylinder 136 together with the sleeve 104, define a clutch pressure chamber 138 in which is positioned an annular piston 140. An axial extension 142 is carried by the piston 140. The forward clutch 134 includes clutch discs and spacer plates 146 and 148 which are brought into frictional engagement, one with respect to the other, when the pressure plate 144 is acted upon by the piston 140 upon introduction of clutch pressure to the annular cylinder pressure chamber 138.

The annular piston 140 defines an annular cylinder 150 for a friction coast clutch 152. This clutch includes alternately positioned clutch discs and spacer plates located adjacent the pressure plate 144 of the forward clutch 134. Located in the annular cylinder 150 is a coast clutch annular piston 154. A set of springs arranged in an assembly as shown at 156 urges piston 154 toward a released position. Spring set 156 has a base plate 158 which is anchored by a snap ring on the sleeve 104.

Piston 154 is adapted to engage the disc and separator plate assembly of the coast clutch 152 when pressure is applied to working pressure chamber 160 defined by the cylinder 150 and the cooperating piston 154.

The discs and separator plates of the coast clutch 152 are apertured to permit the extensions 142 to extend therethrough so that the piston 140 may act on the pressure plate 144 of the forward clutch 134. This allows the forward clutch and the coast clutch to be applied selectively or in tandem.

The clutch discs 146 of the forward clutch 134 are splined to outer race 162 of overrunning clutch 164. Inner race 166 of the clutch 164 is connected directly to clutch element 168 of the coast clutch 152. The clutch discs of the coast clutch 152 are splined to the clutch element 168.

A reverse clutch 170 comprises a friction disc and separator plate assembly including friction discs 172, which are splined to brake element 174. Element 174 is splined at 176 to the clutch sleeve 104.

The reverse clutch 170 includes an annular cylinder 178 formed in brake drum 180 which is surrounded by a 2-4 brake band assembly 182. Brake drum 180 has a hub 184 which is journalled at 186 and 188 on brake element 174 respectively. A brake piston 190 is disposed in the cylinder 178 when actuating pressure is supplied to the working chamber defined by the piston 190 and the cylinder 178. Piston 190 applies an engaging force to the clutch 170 thereby establishing a driving connection between brake drum 180 and element 174.

A spring assembly comprising multiple springs 192 and a supporting cage 194 is anchored by snap ring 196 on the hub 184 of the brake drum 180. It urges the piston 190 to the disengaged position.

The 2-4 brake band assembly 182 comprises a brake band that can be applied by a fluid pressure operated servo similar to the servos described in U.S. Pat. No. 4,347,765. That patent may be referred to supplement this disclosure.

The brake drum 180 is a machined part. It is splined at 198 to a torque transfer member in a form of a stamping 200.

Planetary Gearing

Planetary gearing 14 includes the previously described gear unit 98, which comprises a sun gear 202 that is fixed by welding 203 to torque transfer member 200. Gear unit 98 includes also ring gear 204, planet carrier 206 and planet pinions 208, the latter being journalled on the carrier 206. The carrier 206 is connected directly to brake member 210 which extends over the torque transfer member 200. It is externally splined to provide a driving connection with internally splined brake discs 212 which register with brake separator plates 214 secured to a keyway 216 formed in the interior of housing portion 26.

An annular cylinder 218 is formed in the housing portion 26. It receives an annular piston 220 which is urged in a left hand direction by a multiple spring and cage assembly comprising compression springs 222 and a base plate 224 which is anchored by a snap ring on the housing portion 26.

Brake disc 212 defines a low and reverse brake generally defined by reference numeral 226. This brake 226 is in parallel disposition with respect to an overrunning brake 228 which comprises an inner race 230 connected to brake element 210 and an outer race 232 secured to the housing portion 26. Overrunning brake elements in the form of rollers are disposed between the races.

Carrier 206 is connected also to a ring gear hub 234 which is connected to ring gear 236 of a second planetary gear unit 238. Ring gear 236 is connected also to torque transfer member 132.

Planetary gear unit 238, in addition to ring gear 236, comprises a sun gear 240 connected directly to inner race 166 of the overrunning clutch 164 and to clutch element 160 of the coast clutch 152. Planetary gear elements 242 mesh with sun gear 240 and ring gear 236 and are journalled on carrier 244, the latter being splined to the drive chain hub 94.

The outer periphery of the ring gear 204 is provided with sprocket teeth 246 which registers with drive chain 248 which is provided with internal drive teeth that register with the sprocket teeth 246.

Drive chain 248 is positioned axially approximately in the radial plane of the planetary gear unit 98. It requires no additional axial space in the assembly. It serves as a torque output element of the planetary gearing 98 and 238. By arranging the torque transfer drive chain 248 in this fashion and by arranging the clutches and brakes on the side of the gearing opposite the hydrokinetic converter, a compact overall construction is achieved with a minimum axial space requirement. This is achieved without compromising on the torque capacity of the transmission. The arrangement of the clutches and brakes with respect to the gearing and with respect to the hydrokinetic converter is accomplished by the sleeve shaft arrangement particularly described below.

Turbine sleeve shaft 60 surrounds a front drive shaft 250 which is connected at its right hand end to the engine crankshaft 10 and at its left hand end to the rotor of a positive displacement pump 252, the latter being located at the left hand side of the housing portion 46 as viewed in FIG. 1A. Pump 252 comprises gear elements that are enclosed by pump cover 254 secured to the left side of the housing portion 26. Pump 252 serves as a pressure source for the control system and for the clutches and brakes.

Drive chain 248 is connected drivably to sprocket 256 shown in FIG. 1C. In the embodiment shown sprocket 246 may have 55 teeth and sprocket 256 may have 50 teeth. Although the relative numbers of teeth can be varied depending upon the overall ratio that is desired.

Sprocket 256 is secured to a sun gear hub 258 and a parking gear 260 by drive pins or rivets 262. Sun gear hub 258 forms a part of final drive gear unit 260. This comprises ring gear 266 which is connected to the hub 258 and a ring gear 268 which is fixed to the housing portion 24. A carrier 270 supports planet pinions 272 which mesh with sun gear 266 and stationary ring gear 268. Carrier 270 is connected to differential carrier 274 which is journalled in bushing 276 at the right hand end of the housing portion 24. The left hand end of the carrier 270, as well as the differential carrier, is journalled at 278 on the sun gear hub 258 which in turn is supported by bearings 280 in the lower portion of the housing portion 26 as seen in FIG. 1C.

Housing portions 26 and 24 are secured together by bolts 282, thus forming a housing which was generally indicated by reference numeral 22.

Differential carrier 274 encloses differential bevel pinions 284 which mesh with bevel side gears 286 and 288. Side gear 286 is splined to U-joint input shaft 288, and the corresponding U-joint input shaft 290 at the opposite side of the housing is splined to the other differential bevel side gear 288. Pinion shaft 292 supports the differential pinions 284.

The outboard end of the half shafts are connected to the outboard sides of the U-joints to establish a driving connection with the vehicle traction wheels.

A speedometer drive gear 294 is connected to differential side gear 286. An output shaft speed pickup or speed sensor to 296 serves as a speed pickup or variable inductant counter for obtaining a speed signal that is useful in the control system 84.

Mode of Operation

In FIG. 2 I have shown in schematic form the principal elements of the gearing, the clutches, the final drive and the torque converter. The symbols $R_N$, $P_N$ and $S_N$ are used to designate the ring gears, planet sets and sun gears for the two gear units 238 and 98. The symbol RC is used to designate the first clutch 170. The symbol DC is used to designate the direct clutch 110. The symbol CC is used to designate the coast clutch 152. The symbol FC is used to designate the forward clutch 134. The symbol OWC2 is used to designate the overrunning clutch 164. The symbol OWC1 is used to designate the overrunning brake 228. The 2-4 band 182 is designated by the symbol 2/4 and the low and reverse brake 226 is designated by the symbol L/R.

For continuous operation in the low drive range, the transmission may be conditioned for torque delivery in either direction, in which case the brake L/R is applied. Likewise the coast clutch DC is applied as is the forward clutch, the latter being engaged during each of the forward driving ratios.

To effect continuous operation with engine braking in coast and torque delivery from the engine during drive, the brake 2/4 is applied while the clutches CC and FC are applied. Direct drive operation with no upshift to 4th is accomplished by engaging the direct clutch DC while the clutches FC and CC remain applied.

During operation in the automatic drive mode where upshifts occur automatically, the clutch CC is released. Likewise during operation in the first ratio in the automatic drive mode, clutch L/R is released. Thus the reaction torque for low speed operation in low is obtained by the overrunning brake 228. Overrunning clutch OWC2 delivers torque during each of the forward driving ranges in the automatic forward drive mode. An upshift to the fourth ratio is achieved by engaging brake 2/4, thereby causing OWC2 to overrun. The direct clutch DC is applied during operation in the third and fourth ratios in the forward drive automatic drive mode.

Reverse drive is obtained by engaging the reverse clutch RC while the low and reverse brake L/R is applied. Torque is transmitted then from the turbine shaft and through the reverse clutch RC to the sun gear of gear unit 98. With the brake L/R applied, the carrier for the gear unit 98 acts as a reaction member as the ring gear and the chain are driven in a reverse direction.

In operation in the first drive ratio turbine torque is delivered through the forward clutch and through the overrunning clutch OWC2 to the sun gear for the gear unit 238. The output torque on the carrier for the gear unit 238 is transferred directly through the associated sleeve shaft to the ring gear for the gear unit 98 and the drive chain 20. A parallel mechanical torque delivery path is established as the ring gear for the gear unit 238 drive the carrier for the gear unit 98.

A ratio change to the second ratio is achieved by applying the 2/4 band, thus causing the overrunning brake 228 to freewheel as the ring gear for gear unit 238 drives the carrier for gear unit 98 and the carrier for gear unit 238 drives the ring gear for gear unit 98.

Direct drive is achieved by applying simultaneously the clutches FC and DC, thus causing both overrunning clutches OWC2 and OWC1 to freewheel.

Fourth ratio is obtained by engaging the 2/4 brake band thus allowing the sun gear for the gear unit 98 to act as a reaction point with the carrier for gear unit 98 being driven by the turbine shaft through the engaged clutch DC, the ring gear for the gear unit 98 is overdriven as the clutch OWC2 freewheels.

Having described a preferred form of my invention, what I claim and desire to secure by U.S. Letters Patent is:

1. In a planetary, multiple speed transaxle comprising a converter with an impeller and a turbine, a pair of simple planetary gear units and clutch and brake means for controlling torque transfer through the gear units;
    a driving shaft arranged coaxially with respect to said converter and said gear units on one side of said converter;
    a driven member disposed in spaced, parallel relationship with respect to said driving shaft;
    said clutch and brake means being located on the other side of said gear units;
    a torque transfer drive means for transmitting torque from a torque output element of said gear units, said torque transfer means, including a driving elements and a driven element respectively mounted on the axis of said gear unit and the axis of said driven member, said driving element being located sustantially in the transverse geometric plane of the one of said gear units that is more proximate to said converter; and
    torque transfer shafts disposed concentrically within said gear units and said clutch and brake means for transferring torque between said clutch and brake means, and said turbine and between said clutch and brake means and torque input elements of said gear units.

2. A hydrokinetic, multiple speed transaxle adapted to deliver torque from an engine driven shaft to a torque output shaft, the latter being spaced from and parallel to said engine driven shaft, and said transaxle comprising:
    a torque converter having a turbine and an impeller, said engine driven shaft being connected to said impeller, a turbine sleeve shaft being connected to said turbine;
    a pair of simple planetary gear units, each gear unit having a sun gear, a ring gear and a planetary carrier;
    clutch and brake means disposed concentrically with respect to said converter and said engine driven shaft, said gear units being located on the axis of said converter, between said converter and said clutch and brake means;
    a torque output shaft arranged in spaced, parallel relationship with respect to said converter axis, a final drive gear unit including differential gearing having a torque output element connected to said torque output shaft;

a torque transfer drive means for transferring torque from the ring gear of one of said gear units most proximate to said converter to a torque input element of said final drive gear unit;

said torque transfer drive means including a drive chain disposed in the transverse geometric plane of said one gear unit and connecting drivably the ring gear of said one gear unit with said first drive gear unit.

3. The combination as set forth in claim 2 wherein said ring gear is formal with external sprocket teeth, said torque input element of said final drive gear unit comprising a sprocket with external teeth drivably engaging said chain, said sprocket being coaxial with said torque output shaft.

4. The combination as set forth in claim 2 wherein the ring gear of the other of said gear units is connected to the carrier of said one gear unit, the carrier of said other gear unit being connected to said ring gear of said one gear unit, a reverse clutch means for connecting said turbine sleeve shaft to the sun gear of said one gear unit, a low and reverse brake means for anchoring the-carrier of said one gear unit during low ratio and reverse drive operation, a second and fourth ratio brake means for anchoring the sun gear of said one gear unit during second ratio and fourth ratio operation, direct clutch means for connecting said turbine sleeve shaft to the ring gear of said other gear unit during direct drive operation, and forward clutch means for connecting said turbine sleeve shaft to the sun gear of said other gear unit during forward drive operation in each ratio.

5. The combination as set forth in claim 3 wherein the ring gear of the other of said gear units is connected to the carrier of said one gear unit, the carrier of said other gear unit being connected to said ring gear of said one gear unit, a reverse clutch means for connecting said turbine sleeve shaft to the sun gear of said one gear unit, a low and reverse brake means for anchoring the carrier of said one gear unit during low ratio and reverse drive operation, a second and fourth ratio brake means for anchoring the sun gear of said one gear unit during second ratio and fourth ratio operation, direct clutch means for connecting said turbine sleeve shaft to the ring gear of said other gear unit during direct drive operation, and forward clutch means for connecting said turbine sleeve shaft to the sun gear of said other gear unit during forward drive operation in each ratio.

6. The combination as set forth in claim 4 wherein said forward clutch means includes an overrunning clutch means arranged in series relationship therewith, and a coast friction clutch means arranged in parallel relationship with respect to said overrunning clutch means whereby coast torque may be delivered through said gear units.

7. The combination as set forth in claim 6 wherein said coast clutch means and said forward clutch means comprises a friction disc pressure operated actuator, said actuator including a cylinder adapted to carry friction members of said forward clutch and said coast clutch in axially spaced disposition, a large piston in said cylinder adapted to energize the forward clutch friction member, a coast clutch cylinder formed in said large piston, a small piston in said coast clutch cylinder, said small piston being adapted to energize the friction members of said coast clutch.

8. The combination as set forth in claim 7 wherein said large piston has an extension engaging the friction members of said forward clutch, the friction members of said coast clutch being located between said large piston and the friction members of said forward clutch, the assembly of said coast clutch, said forward clutch and the pistons and cylinders for both thereby requiring a minimum axial overall dimension.

* * * * *

UNITED STATES PATENT AND TRADEMARK OFFICE
CERTIFICATE OF CORRECTION

PATENT NO. : 4,938,097

DATED : July 3, 1990

INVENTOR(S) : Stanley L. Pierce

It is certified that error appears in the above-identified patent and that said Letters Patent is hereby corrected as shown below:

Column 8, line 36, after "means" delete the comma (,).

Column 8, line 37, delete "elements" and insert --element--.

Column 9, line 8, after "disposed" insert --substantially--.

Column 9, line 10, delete "first" and insert --final--.

Column 9, line 24, after "the" delete the hyphen (-).

Signed and Sealed this

Thirty-first Day of December, 1991

Attest:

HARRY F. MANBECK, JR.

*Attesting Officer*     *Commissioner of Patents and Trademarks*